(12) United States Patent
Weis et al.

(10) Patent No.: US 11,339,834 B2
(45) Date of Patent: May 24, 2022

(54) CLUTCH DEVICE WITH AXIALLY-ACTING FLUID CONVEYING DEVICE

(71) Applicant: Schaeffler Technologies AG & Co. KG, Herzogenaurach (DE)

(72) Inventors: Johannes Weis, Fürth (DE); Steffen Huber, Achern (DE); Jens Genter, Achern (DE); Andreas Trinkenschuh, Bühl (DE); Gerold Steinel, Bühl (DE); Felix Vogel, Sinzheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 707 days.

(21) Appl. No.: 15/738,793

(22) PCT Filed: Jun. 22, 2016

(86) PCT No.: PCT/DE2016/200286
§ 371 (c)(1),
(2) Date: Feb. 14, 2019

(87) PCT Pub. No.: WO2016/206683
PCT Pub. Date: Dec. 29, 2016

(65) Prior Publication Data
US 2021/0324917 A1  Oct. 21, 2021

(30) Foreign Application Priority Data
Jun. 23, 2015 (DE) .......................... 102015211528.3

(51) Int. Cl.
*F16D 13/72* (2006.01)
*F16D 25/12* (2006.01)
(Continued)

(52) U.S. Cl.
CPC ............. *F16D 13/72* (2013.01); *F16D 13/52* (2013.01); *F16D 13/74* (2013.01); *F16D 25/123* (2013.01)

(58) Field of Classification Search
CPC ........ F16D 13/72; F16D 25/123; F16D 13/74; F16D 13/52; B60K 6/38; F16H 57/042;
(Continued)

(56) References Cited

U.S. PATENT DOCUMENTS 2,935,889 A * 5/1960 Adams ..................... F16D 13/74
74/467
4,473,144 A * 9/1984 Allori .................... F16D 25/123
188/264 D
(Continued)

FOREIGN PATENT DOCUMENTS

CN    1527911 A    9/2004
CN    1737394 A    2/2006
(Continued)

OTHER PUBLICATIONS

Machine language translation of CN103307132.*
International Search Report for PCT/DE2016/200286; 3 pgs; dated Oct. 26, 2016 by European Patent Office.

*Primary Examiner* — Mark A Manley

(57) ABSTRACT

A conveying device is located inside a clutch device to amplify a fluid flow in an axial direction, i.e. parallel to a rotation axis of the clutch device, and hence the fluid flow can be kept sufficiently great even in the moved portions of a fluid line. The conveying device can be used in clutch devices which are arranged as separating clutches in a hybrid module. The conveying device allows even the complicated fluid lines within hybrid modules to be supplied with sufficient fluid at all times. The conveying device may be arranged at least on the first or second clutch side, and hence the quantity of conveyed fluid is dependent on the rotation speed.

11 Claims, 6 Drawing Sheets

(51) Int. Cl.
*F16D 13/52* (2006.01)
*F16D 13/74* (2006.01)

(58) Field of Classification Search
CPC ............. F16H 57/0427; F16H 57/0436; F16H 57/0473
See application file for complete search history.

(56) References Cited

U.S. PATENT DOCUMENTS

| | | | |
|---|---|---|---|
| 4,724,942 A | 2/1988 | Casse et al. | |
| 2008/0128212 A1* | 6/2008 | Utzat | F16H 57/0447 184/11.4 |
| 2013/0213043 A1* | 8/2013 | Kasuya | F02B 63/04 60/700 |

FOREIGN PATENT DOCUMENTS

| | | | |
|---|---|---|---|
| CN | 103307132 | * | 9/2013 |
| DE | 3133478 A1 | | 4/1982 |
| DE | 3445333 A1 | | 7/1985 |
| DE | 10110897 A1 | | 9/2001 |
| DE | 10049459 A1 | | 4/2002 |
| DE | 102004016166 A1 | | 10/2004 |
| DE | 112010003465 T5 | | 6/2012 |
| DE | 102011087458 A1 | | 6/2013 |
| DE | 102013203510 A1 | | 9/2013 |
| DE | 112013000259 T5 | | 9/2014 |
| DE | 102014205380 A1 | | 10/2014 |
| DE | 102014204841 A1 | | 9/2015 |
| EP | 1930613 A1 | | 6/2008 |
| JP | S59131035 A | | 7/1984 |
| WO | 2005119077 A1 | | 12/2005 |

\* cited by examiner

CLUTCH DEVICE WITH AXIALLY-ACTING FLUID CONVEYING DEVICE

CROSS-REFERENCE TO RELATED APPLICATIONS

This application is the United States National Phase of PCT Appln. No. PCT/DE2016/200286 filed Jun. 22, 2016, which claims priority to German Application No. DE102015211528.3 filed Jun. 23, 2015, the entire disclosures of which are incorporated by reference herein.

TECHNICAL FIELD

The present invention concerns a clutch device for transmission of a torque.

BACKGROUND

Clutch devices are known in numerous embodiments in the prior art. In certain applications, wet clutches which are connected to a fluid supply are preferably used. Multiplate clutches constitute a particular form of wet clutches, in which an oily fluid is distributed radially inside the clutch by means of blade wheels.

In the known clutch devices however, it is noted that the oil supply is not ensured to the desired extent in all regions of the clutch device and in all operating states. It may therefore occur that portions further away, such as e.g. more remote bearings, are not adequately supplied with fluid.

Fluid lines, extending both through a stationary housing and through at least the rotating first or second clutch sides, can lead to undesirable fluid leaks. The fluid is usually an oil used in the clutch device which serves e.g. for lubrication and cooling. If the fluid is now conveyed through the fluid line, fluid losses occur, in particular at the portions of the clutch device which move relative to each other. This occurs in particular when rotating and stationary components are moved relative to each other. It has been found that fluid builds up before the rotating portions of the fluid line, whereby an undesirable outflow of fluid in the radial direction is promoted. In addition to the build-up effect described, the built-up fluid is also accelerated in the circumferential direction, whereby the centrifugal forces occurring further promote the radial outflow. The two effects mean that fluid is conveyed through the rotating portions of the fluid line only with high losses and resistances, and the portions of the clutch device lying behind there in the flow direction are not always adequately supplied with fluid.

BRIEF SUMMARY

By the use of a conveying device inside the clutch device, the fluid flow can be amplified in the axial direction, i.e. parallel to the rotation axis of the clutch device, and hence the fluid flow can be kept sufficiently great even in the moved portions of the fluid line.

The conveying device can be used in clutch devices which are arranged as separating clutches in a hybrid module. The conveying device allows even the complicated fluid lines within hybrid modules to be supplied with sufficient fluid at all times.

The conveying device may be arranged at least on the first or second clutch side, and hence the quantity of conveyed fluid is dependent on the rotation speed. As described above, the fluid loss occurs in particular when portions of the clutch device are moved relative to each other. Conversely, in order to avoid fluid loss, a conveying device should preferably be activated only when this relative movement occurs. The advantage of arranging the conveying device on a rotating first or second clutch side is that the energy required for operation of the conveying device is then applied only when a fluid loss must actually be prevented or reduced. While stationary, the conveying effect of the conveying device is not required.

Multiplate clutches, and in particular load clutches, in which the fluid to be conveyed is an oil, are suitable for use of the clutch device. Such multiplate clutches or wet clutches are available in numerous variants and can be heavily loaded thermally and mechanically because of the fluid supply.

An example embodiment of the conveying device has at least one rotor or stator blade. Thus with a rotating rotor blade, the fluid can be conveyed in the axial direction of the clutch device thanks to a suitable working angle of the rotor blade. Here, the rotor blade exerts a conveying force on the fluid which has at least one force component direction in the axial direction. Alternatively to direct force effects from the rotor blade with an axial force component, the fluid can also be accelerated by a rotor blade initially in the circumferential direction. After this initial acceleration in the circumferential direction, at least one stator blade may be provided; the fluid accelerated in the circumferential direction hits this blade and is thus deflected in the axial direction. In this way also, with a combination of rotor and stator blades, an axial conveying force can be exerted on the fluid.

In an example embodiment, it is provided that the rotor blade in rotating state exerts a conveying force on the fluid in the axial direction. Alternatively, however, the rotor blade may cooperate with the stator blade in order to exert an axial conveying force in this way.

To improve the conveying power, it is also provided that the conveying device has a plurality of moved rotor blades which may be arranged on a circle segment around the rotation axis of the clutch device. In the case where the rotor blades and stator blades cooperate, the number of stator blades may be increased accordingly. The rotor or stator blades may be arranged on a circle segment in a circle.

For production reasons, it may be favorable to make the conveying device of plastic or metal. The conveying device may e.g. be formed as a one-piece annular disc with molded and angled rotor blades, and can be produced in a single production process e.g. as a plastic injection molding. In this way, the conveying device can be produced economically.

Finally, in an example embodiment of the invention, it is provided that the conveying device is arranged, in a flow direction of the fluid, in the region upstream of axial fluid passage openings of portions of the fluid line which are moved relative to each other. As already described above, at such portions of the fluid line which are moved relative to each other, fluid can build up as soon as the portions are moved relative to each other. Therefore it is efficient to arrange the conveying device at this point and exert the axial conveying force on the fluid at these points, whereby the build-up of fluid in front of the moved fluid passage openings is effectively countered. As a result, more fluid can pass through the fluid passage openings and the portions of the clutch device lying behind can be supplied better with fluid.

BRIEF DESCRIPTION OF THE DRAWINGS

Example embodiments are explained in more detail below with reference to the figures. It is pointed out that the figures show embodiment variants but is not restricted to these. The drawings show diagrammatically.

DETAILED DESCRIPTION

Figure 1:
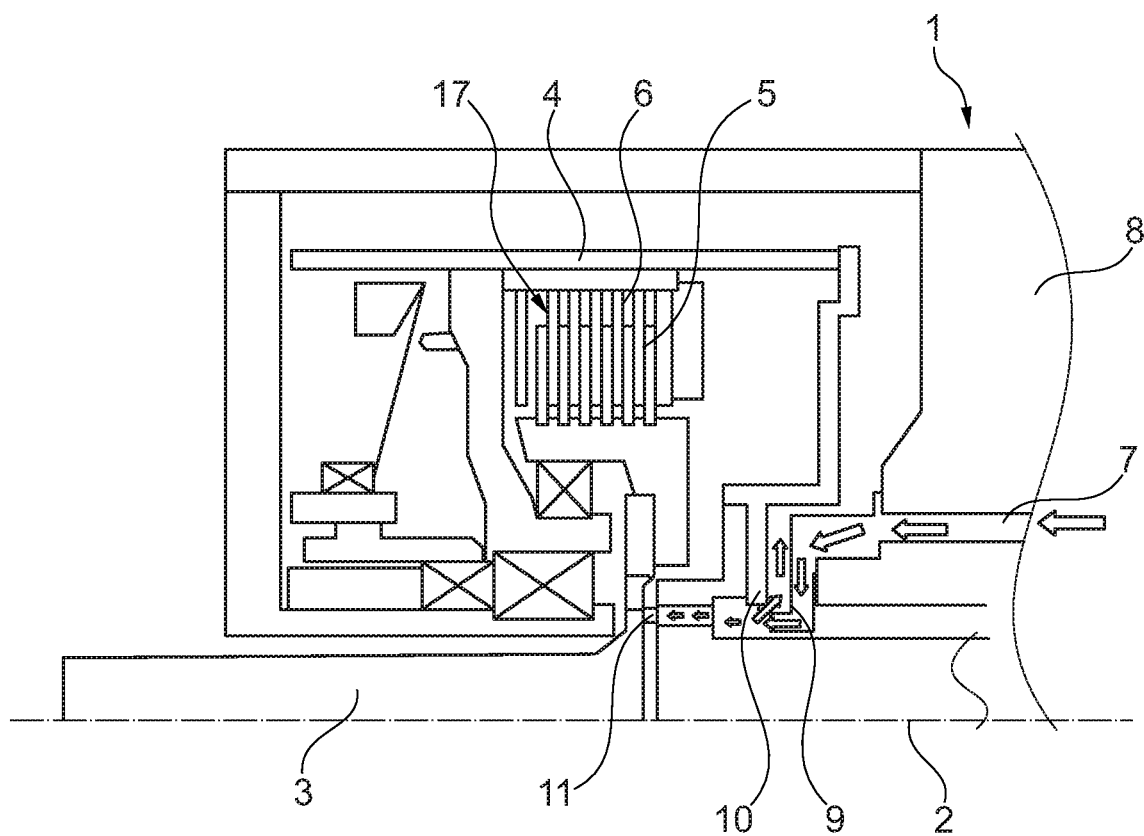
FIG. 1: an axial sectional view of a prior art clutch device.

FIG. 1 shows a prior art clutch device 1, for transmission of a torque about a rotation axis 2. The clutch device 1 has a first clutch side 3 which is formed as a rotating shaft. The clutch device 1 also has a second clutch side 4, wherein torque is transmitted between the first clutch side 3 and the second clutch side 4 via friction partners 5. The friction partners are formed as a multiplate clutch and, on corresponding exertion of a pressure force in the axial direction, can be brought into frictional engagement with each other and hence transmit a torque between the first and second clutch sides. Furthermore, the clutch device 1 has a fluid line 7 via which a fluid is conducted into a housing 8 of the clutch device 1. The arrows shown indicate diagrammatically the direction and strength of the fluid flow. It is evident that a fluid loss occurs in the radial direction between a stationary guide plate 9 on the housing side and a rotating portion 10 of the second clutch side 4.

Thus only a small part of the fluid flow reaches a fluid passage opening 11 in the first clutch side 3, whereby the portions of the clutch device 1 lying to the left of the fluid passage opening 11 are only inadequately supplied with fluid.

Figure 2:
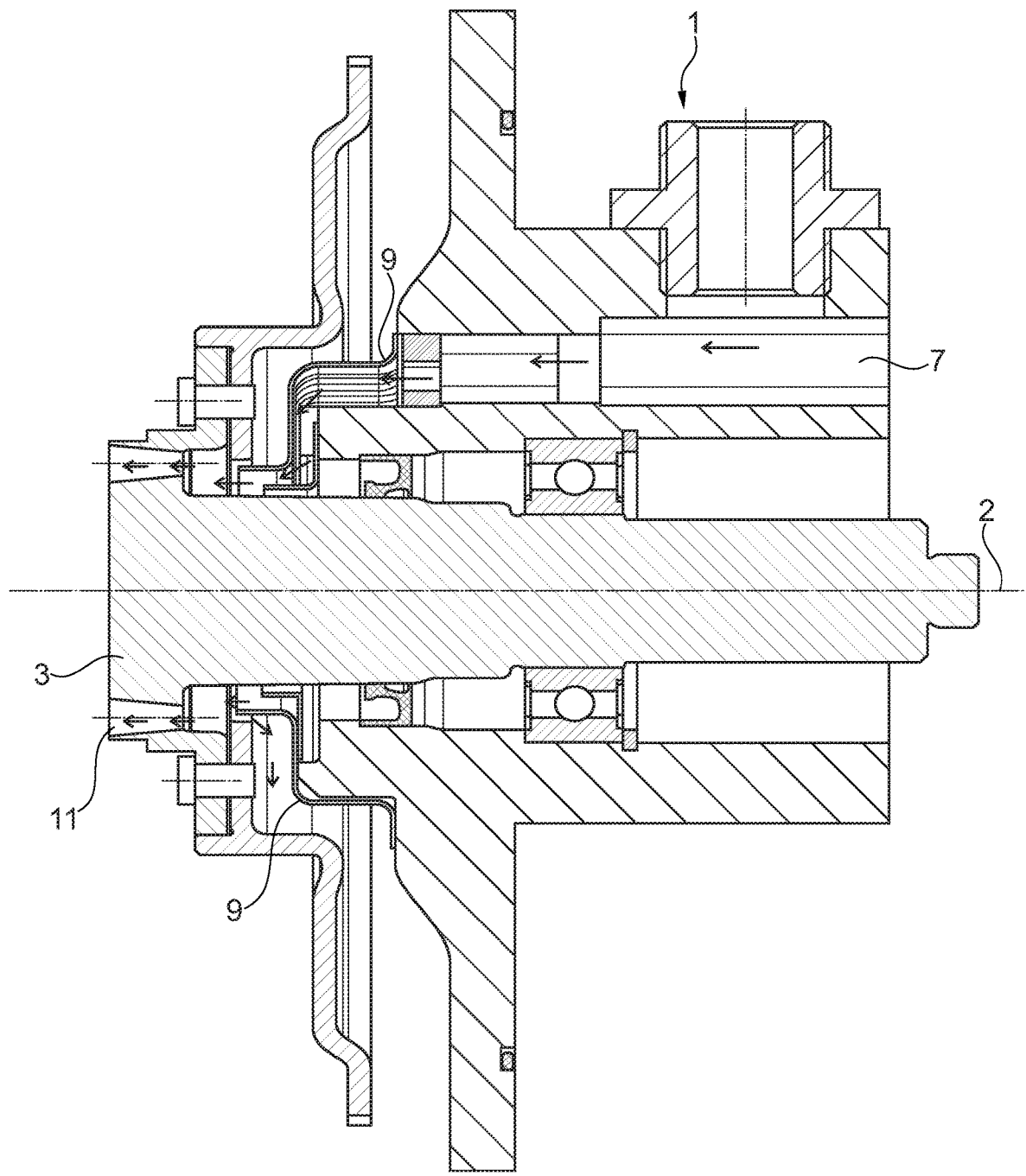
FIG. 2: a partially depicted axial sectional view of a prior art clutch device with fluid flow indicated.

FIG. 2 shows another prior art clutch device 1 again in an enlarged and only partially depicted axial sectional view. In the upper region of the rotation axis 2, the desired fluid flow is depicted by arrows. In the lower half of the sectional view, the fluid flow actually occurring is shown, wherein again it is evident that after passing the guide plate 9, a part flow of fluid flows away downward in the radial direction and hence only a small fluid flow actually passes through the fluid passage opening 11.

Figure 3:
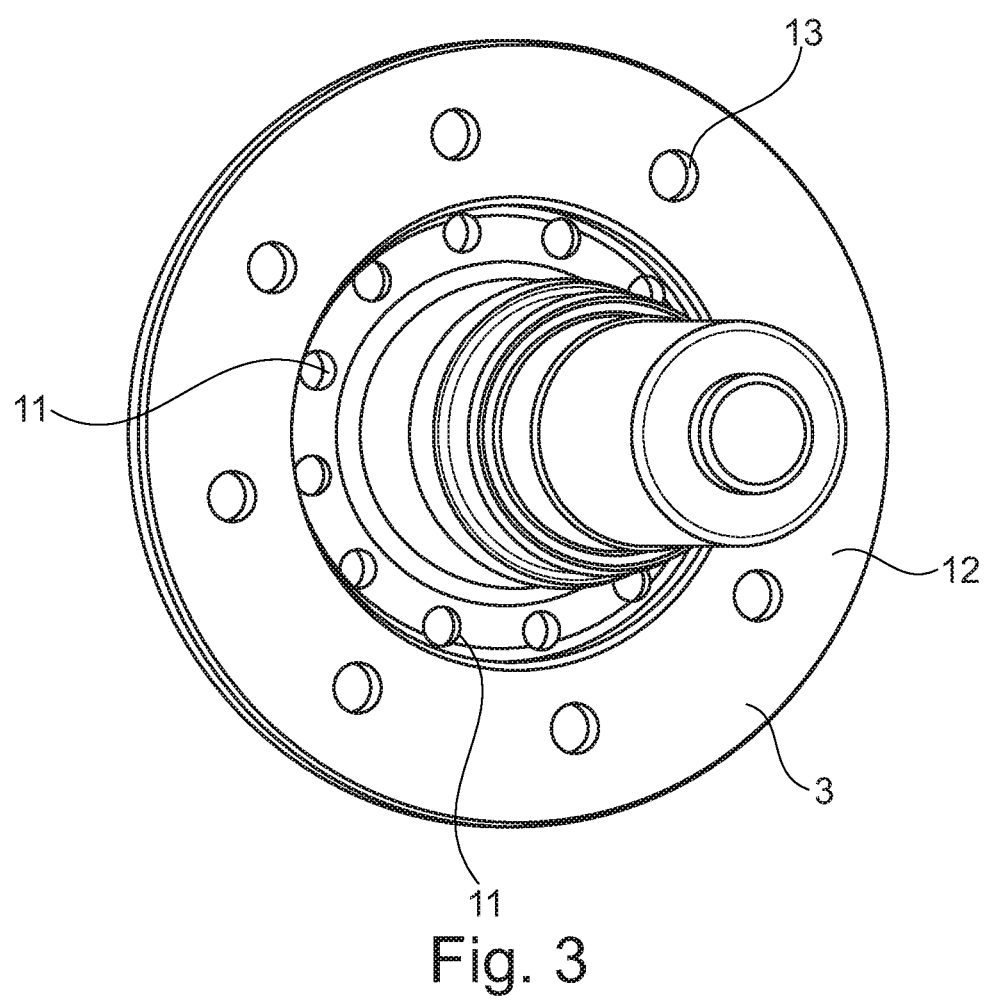
FIG. 3: a perspective depiction of a rotating shaft.

FIG. 3 shows a perspective view of the first clutch side which is formed as a rotating shaft with a molded flange 12. In the flange 12, both fluid passage openings 11 and fixing bores 13 are provided, which are distributed evenly over the periphery on a circle segment.

Figure 4:
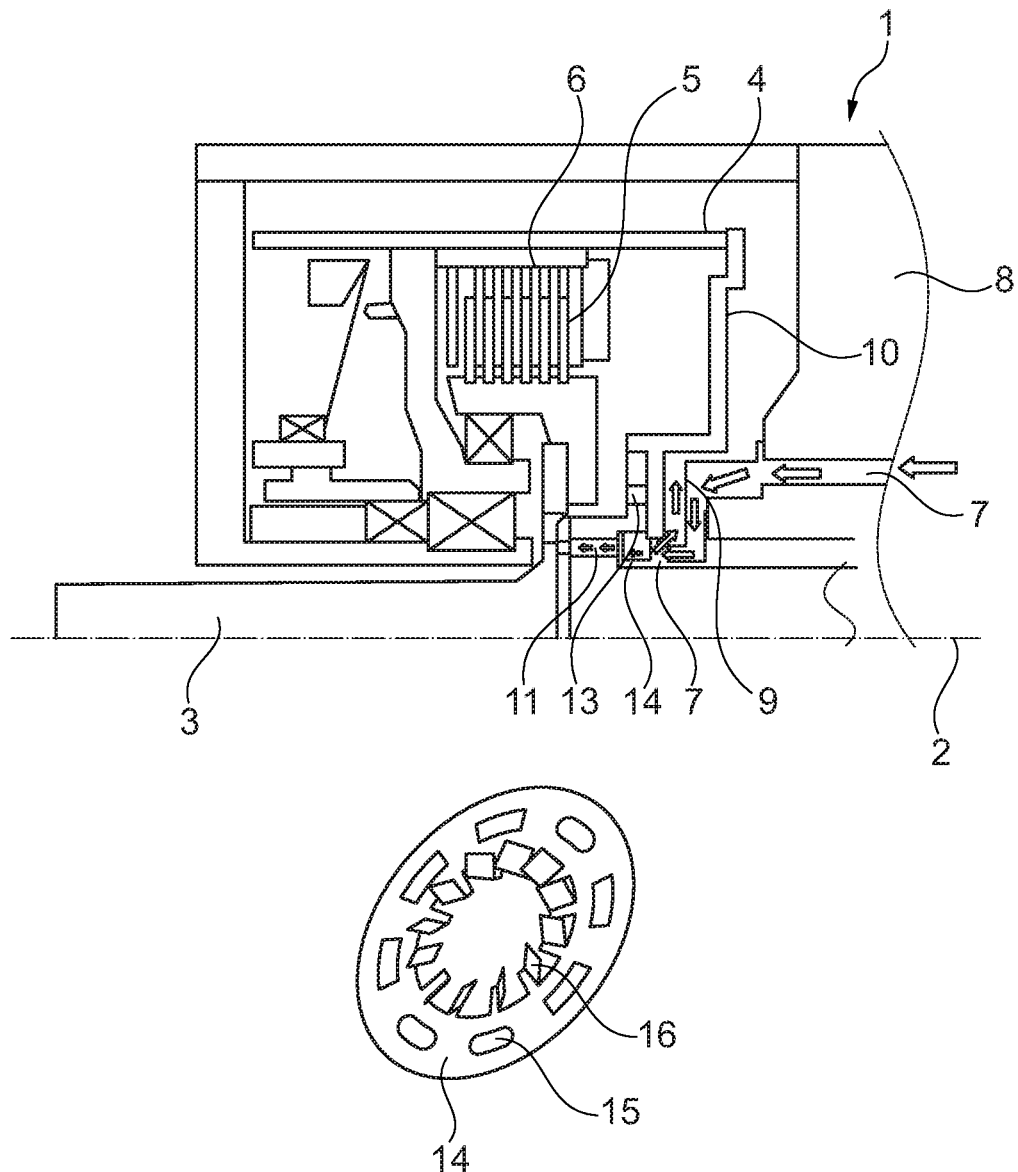
FIG. 4: an axial sectional view of a clutch device with a conveying device, shown in perspective.

FIG. 4 shows an axial sectional view through the clutch device 1. Here, directly behind the guide plate 9, a conveying device 14 is arranged in the fluid line 7 which conveys the inflowing fluid through the fluid passage opening 11 into the clutch device 1. The conveying device 14 is fixedly connected to the first clutch side 3, formed as a shaft, via the fixing bore 13 and moves in rotation therewith. By exerting a conveying force on the fluid in the axial direction, parallel to the rotation axis 2, the fluid flow through the fluid passage opening 11 is improved. A build-up of fluid before the fluid passage opening 11 is thus effectively avoided. At the same time, the radial outflow of fluid between the rotating portion 10 and the guide plate 9 can be significantly reduced or even avoided with the conveying device 14. In the lower region of FIG. 4, the conveying device 14 is depicted alone in a perspective view. The conveying device 14 has openings 15 on its outer periphery which allow a connection to the first clutch side 3. Here, the number and position of the openings 15 is selected such that these correspond to the fixing bores 13 and e.g. can be connected by means of rivets. Furthermore, the conveying device 14 has a plurality of rotor blades 16 which are angled such that, on rotation of the conveying device 14 about the rotation axis 2, at least an axial conveying force is exerted on the fluid. The conveying force thus has an axially parallel force component, directed to the left in the image plane, in order to support the throughflow of fluid through the fluid passage opening 11. The lubrication of the entire clutch device with fluid is thus improved since substantially more fluid is conveyed into the region behind the fluid passage openings 11.

Figure 5:
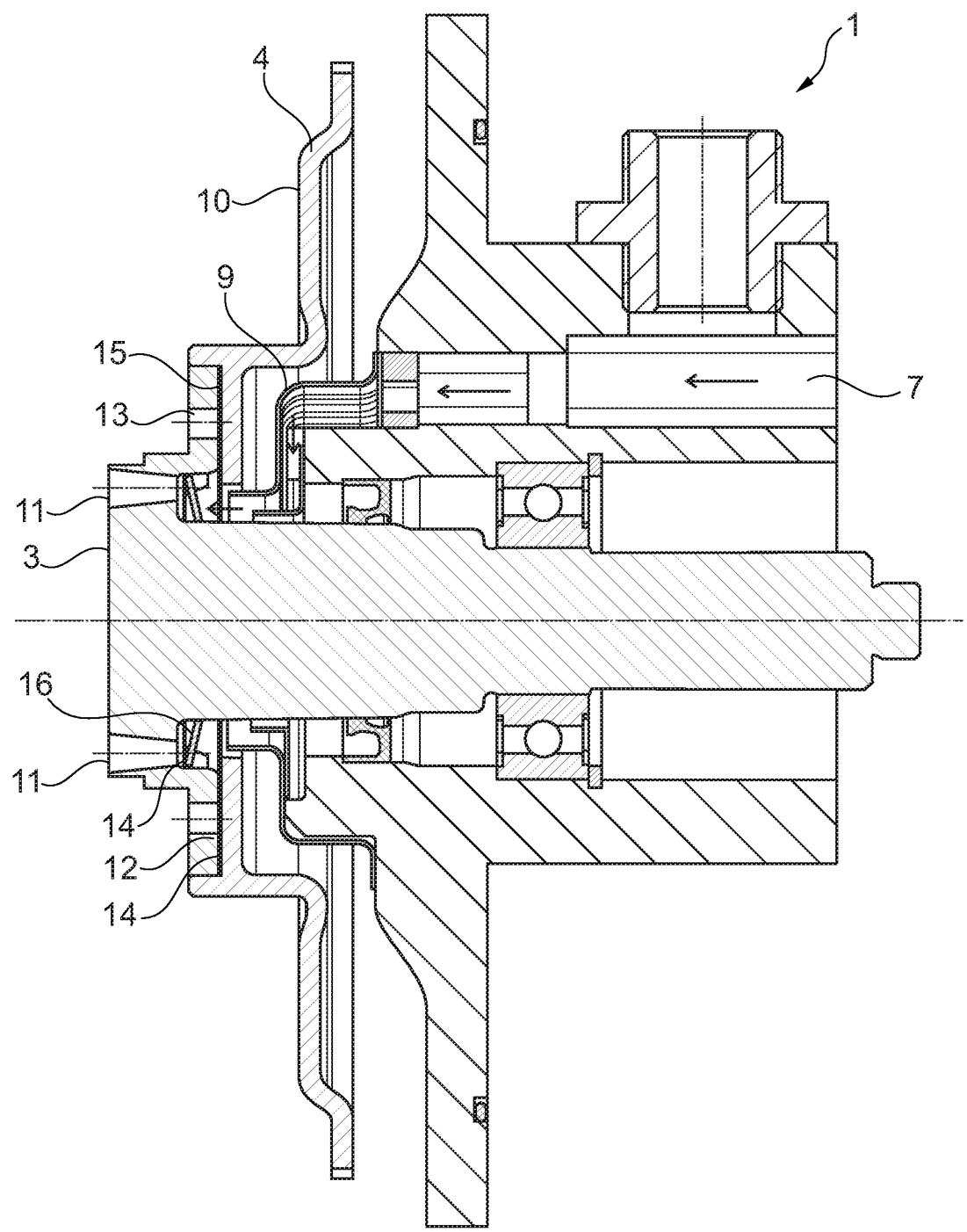
FIG. 5: a partial axial sectional view of a clutch device.

FIG. 5 shows a clutch device 1, again partially in an axial sectional view. In this view, it is evident that the conveying device 14 can be integrated in the clutch device 1. It is here provided that the rotor blades 16 are arranged directly in front of the fluid passage opening 11 so that the conveying force can be exerted on the fluid in the axial direction. The conveying device 14 is made of a thin sheet metal or one-piece plastic part which takes up only minimal installation space and lies flush on the flange 12 on the first clutch side. The rotor blades 16 provided protrude into the installation space in front of the fluid passage opening 11. As indicated by the arrows, in this embodiment too, no fluid loss occurs or only a slight fluid loss in the radial direction, since the fluid flow in the axial direction is supported by the conveying device 14.

Figure 6:
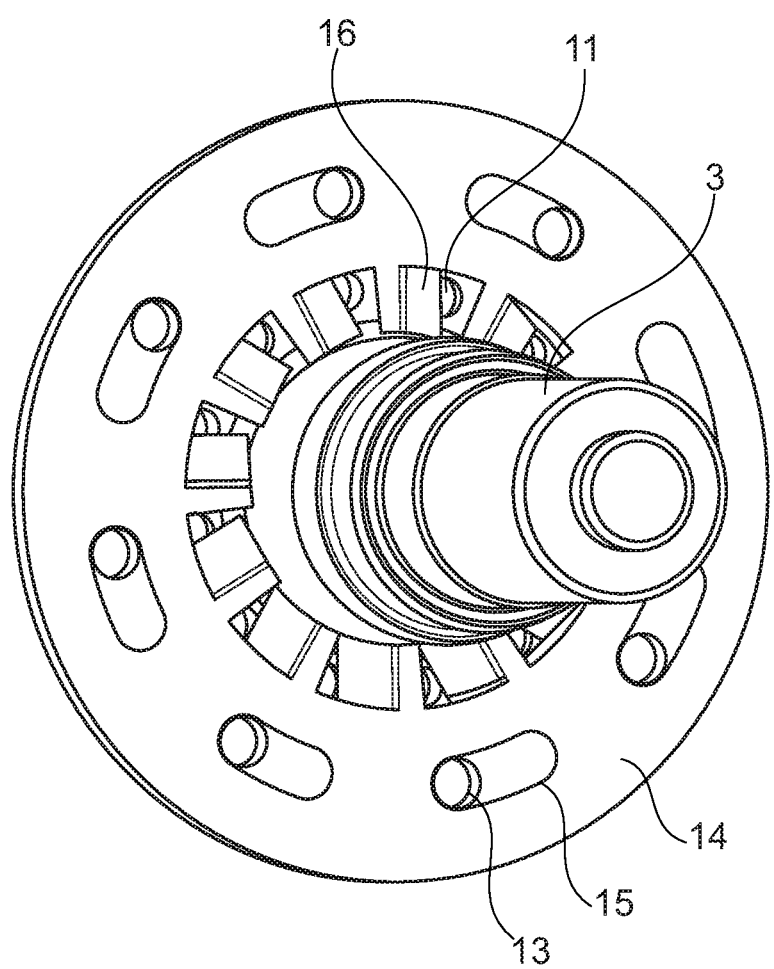
FIG. 6: a perspective depiction of a conveying device with a rotating shaft.

Finally, FIG. 6 again shows the first clutch side 3 in a perspective view. The conveying device 14 is arranged on the first clutch side 3, wherein the fixing bores 13 and the openings 15 are aligned with each other and for example can be connected together by rivets or bolts (not shown). In this view, it is also clearly evident that the rotor blades 16 used are arranged in front of the fluid passage openings 11, in order to achieve as efficient a fluid delivery as possible by efficient exertion of the conveying force on the fluid. As can be seen, the conveying device 14 requires only a small installation space and thus can be integrated into almost all existing clutch devices. Also, the conveying device can be produced with little complexity and hence at low cost.

LIST OF REFERENCE SYMBOLS

1 Clutch device
2 Rotation axis
3 First clutch side
4 Second clutch side
5 First friction partner
6 Multiplate clutch
7 Fluid line
8 Housing
9 Guide plate
10 Rotating portion
11 Fluid passage opening
12 Flange
13 Fixing bore
14 Conveying device
15 Opening
16 Rotor blade
17 Second friction partner

The invention claimed is:

1. A clutch device for transmitting a torque about a rotation axis between a first clutch side and a second clutch side, comprising:

a stationary housing;
at least one first friction partner installed in the stationary housing and connected in a torque-transmitting fashion to the first clutch side, wherein the first clutch side is formed as a rotating shaft with a molded flange having a plurality of fluid passage openings and a plurality of fixing bores distributed about a circumference thereof, wherein the plurality of fixing bores is positioned radially outside the plurality of fluid passage openings;
at least one second friction partner installed in the stationary housing and connected in a torque-transmitting fashion to the second clutch side;
a fluid line extending through the stationary housing and arranged to supply a fluid to the clutch device via the fluid passage openings; and,
a conveying device provided in the fluid line within the clutch device for conveying the fluid in an axial direction of the rotation axis, wherein the conveying device is fixedly connected to the molded flange via the fixing bores;
wherein the friction partners can be brought into frictional engagement by a pressure force in order to transmit the torque between the first and second clutch sides.

2. The clutch device as claimed in claim 1, wherein the clutch device is arranged as a separating clutch in a hybrid module.

3. The clutch device as claimed in claim 1, wherein the conveying device is arranged within the fluid line such that a quantity of conveyed fluid is dependent on a rotation speed.

4. The clutch device as claimed in claim 1, wherein the clutch device is a wet, multiplate clutch and the fluid is oil.

5. The clutch device as claimed in claim 1, wherein the conveying device comprises a rotor blade.

6. The clutch device as claimed in claim 5, wherein the rotor blade is arranged to exert a conveying force on the fluid in the axial direction when rotating.

7. The clutch device as claimed in claim 1, wherein the conveying device comprises a plurality of rotating rotor blades arranged directly in front of the fluid passage openings.

8. The clutch device as claimed in claim 1, wherein the conveying device is formed from plastic or metal.

9. The clutch device as claimed in claim 1, wherein:
the fluid line comprises a first axial fluid passage opening and a second axial fluid passage opening;
the first axial fluid passage opening is arranged to move relative to the second axial fluid passage opening;
at least a portion of the conveying device is aligned with the first axial fluid passage opening or the second axial fluid passage opening in a flow direction of the fluid.

10. The clutch device as claimed in claim 1, wherein the conveying device includes a plurality of openings defined in an outer periphery that are aligned with the plurality of fixing bores for connection with the first clutch side.

11. The clutch device as claimed in claim 1, wherein the conveying device is fixedly connected to the molded flange via rivets or bolts.

* * * * *